United States Patent
Hoover et al.

(10) Patent No.: US 10,991,364 B1
(45) Date of Patent: Apr. 27, 2021

(54) OBTAINING CONTEXT DATA

(71) Applicant: Amazon Technologies, Inc., Seattle, WA (US)

(72) Inventors: Thomas Jay Hoover, Seattle, WA (US); Srinivas Palla, Redmond, WA (US); Anupam Kumar, Seattle, WA (US); Aravindhan Rathakrishnan, Natesa Nagar (IN); Andrei Dorin Zaharia, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 164 days.

(21) Appl. No.: 16/134,492

(22) Filed: Sep. 18, 2018

(51) Int. Cl.
| | |
|---|---|
| *G10L 15/00* | (2013.01) |
| *G10L 15/18* | (2013.01) |
| *G10L 15/30* | (2013.01) |
| *G10L 15/22* | (2006.01) |
| *G06F 16/2452* | (2019.01) |
| *G06F 40/295* | (2020.01) |
| *G10L 15/08* | (2006.01) |

(52) U.S. Cl.
CPC ..... *G10L 15/1815* (2013.01); *G06F 16/24522* (2019.01); *G06F 40/295* (2020.01); *G10L 15/22* (2013.01); *G10L 15/30* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 9,715,875 B2* | 7/2017 | Piernot | G06F 3/167 |
| 10,051,083 B2* | 8/2018 | Matsuda | H04L 67/36 |
| 10,373,617 B2* | 8/2019 | Piernot | G06F 3/167 |
| 10,623,527 B2* | 4/2020 | Matsuda | H04L 67/36 |
| 10,770,073 B2* | 9/2020 | Piernot | G10L 15/22 |
| 2012/0303792 A1* | 11/2012 | Sathish | G06F 16/9535 709/224 |
| 2017/0235839 A1* | 8/2017 | Shaw | G06Q 30/0631 707/709 |
| 2018/0260189 A1* | 9/2018 | Li | G06F 3/0304 |
| 2018/0315427 A1* | 11/2018 | Kwon | G10L 15/1815 |
| 2019/0005021 A1* | 1/2019 | Miller | G10L 15/26 |
| 2020/0193997 A1* | 6/2020 | Piernot | G06F 3/167 |

\* cited by examiner

*Primary Examiner* — Satwant K Singh
(74) *Attorney, Agent, or Firm* — Pierce Atwood LLP

(57) ABSTRACT

Systems including a universal context aggregator configured to pre-fetch context information that may be used to perform various processes with respect to a user input are described. The aggregator may have access to data representing what context information components of the system routinely request in various situations. When a particular situation is present, prior to being queried, the aggregator may pre-fetch context information that the aggregator is likely to be queried for.

20 Claims, 14 Drawing Sheets

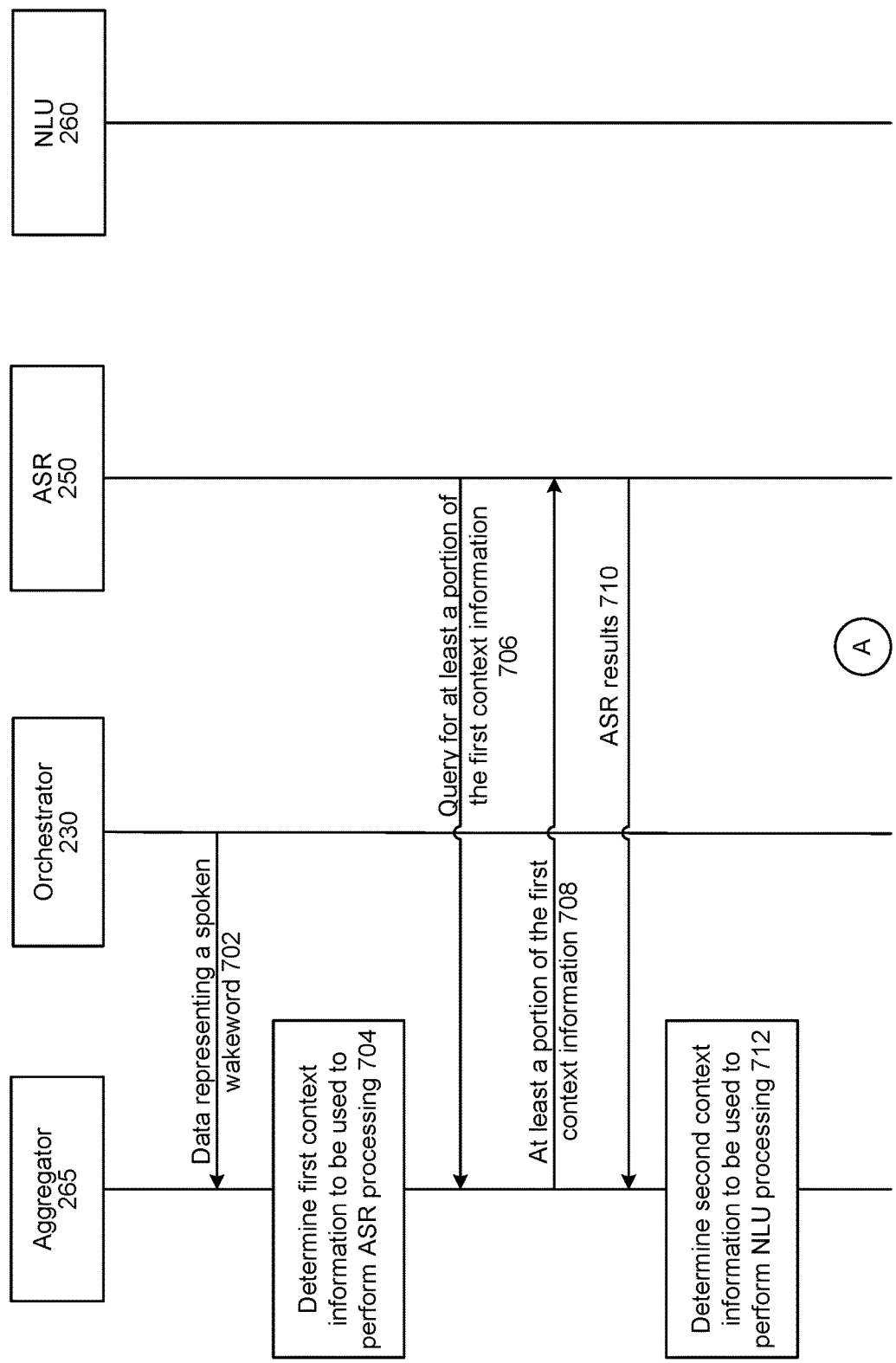

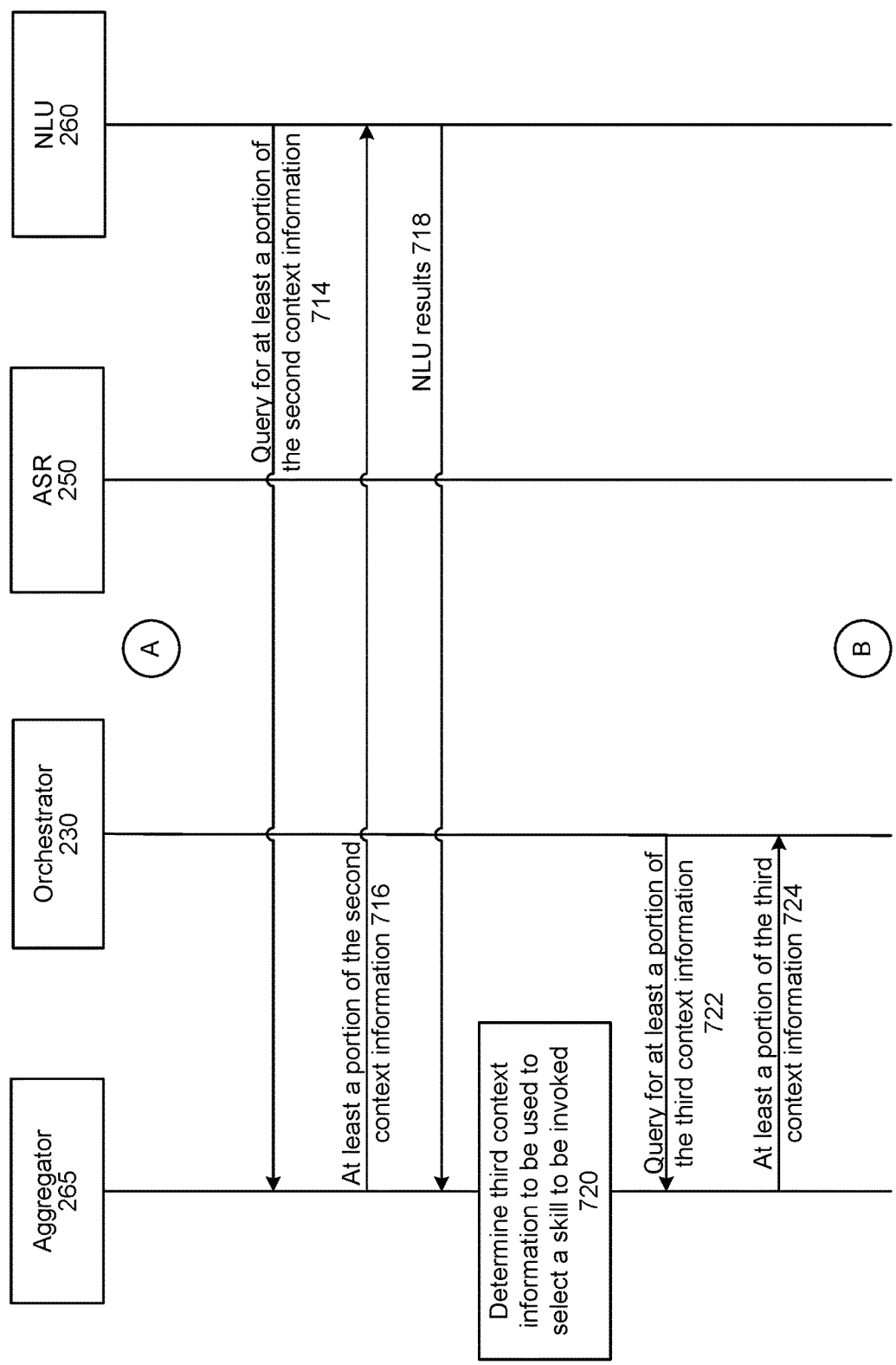

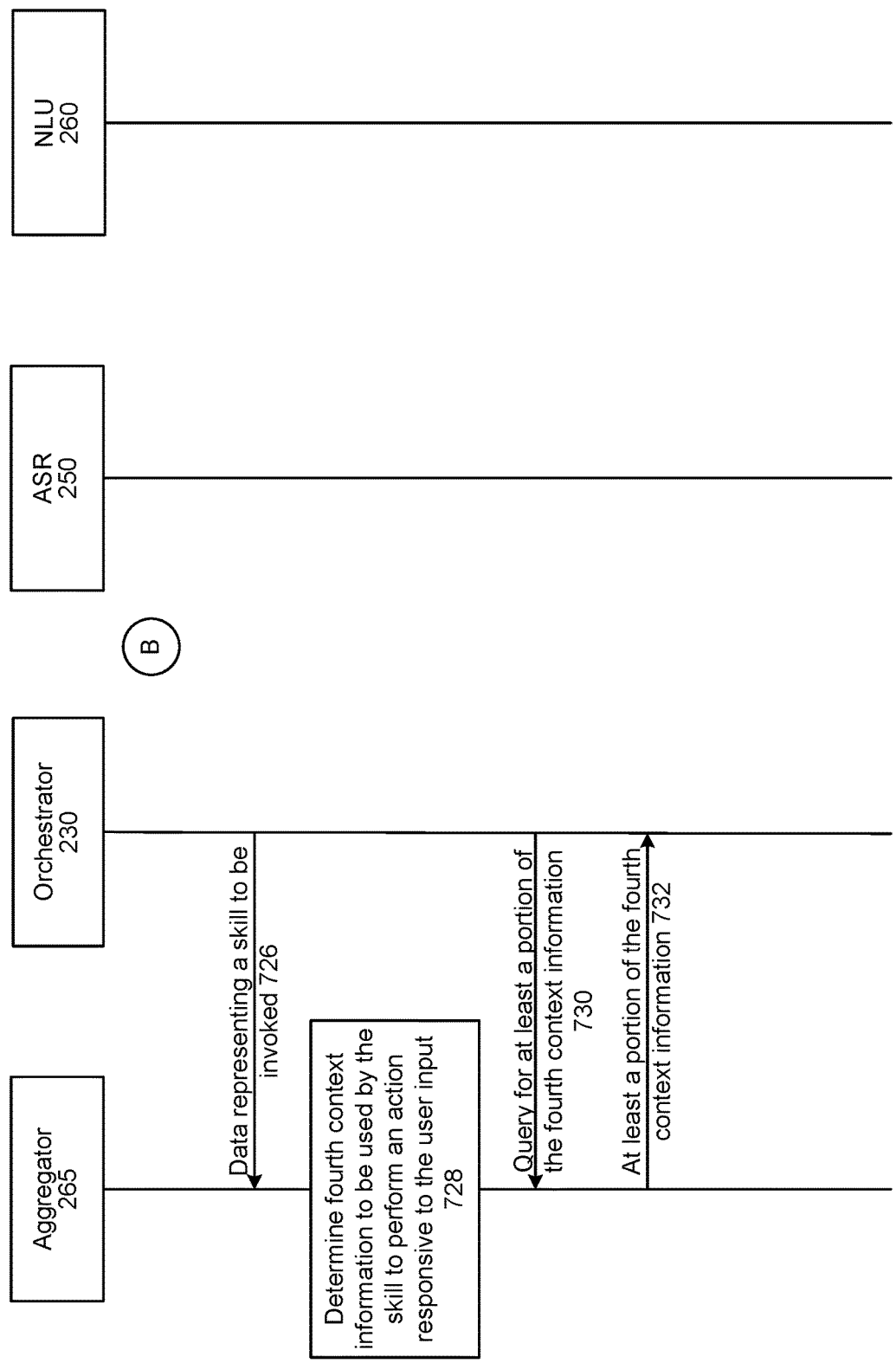

OBTAINING CONTEXT DATA

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 7A through 7C are a signal flow diagram illustrating an example of how context information may be stored and aggregated with respect to processing performed for a user input according to embodiments of the present disclosure.

DETAILED DESCRIPTION

Figure 1:
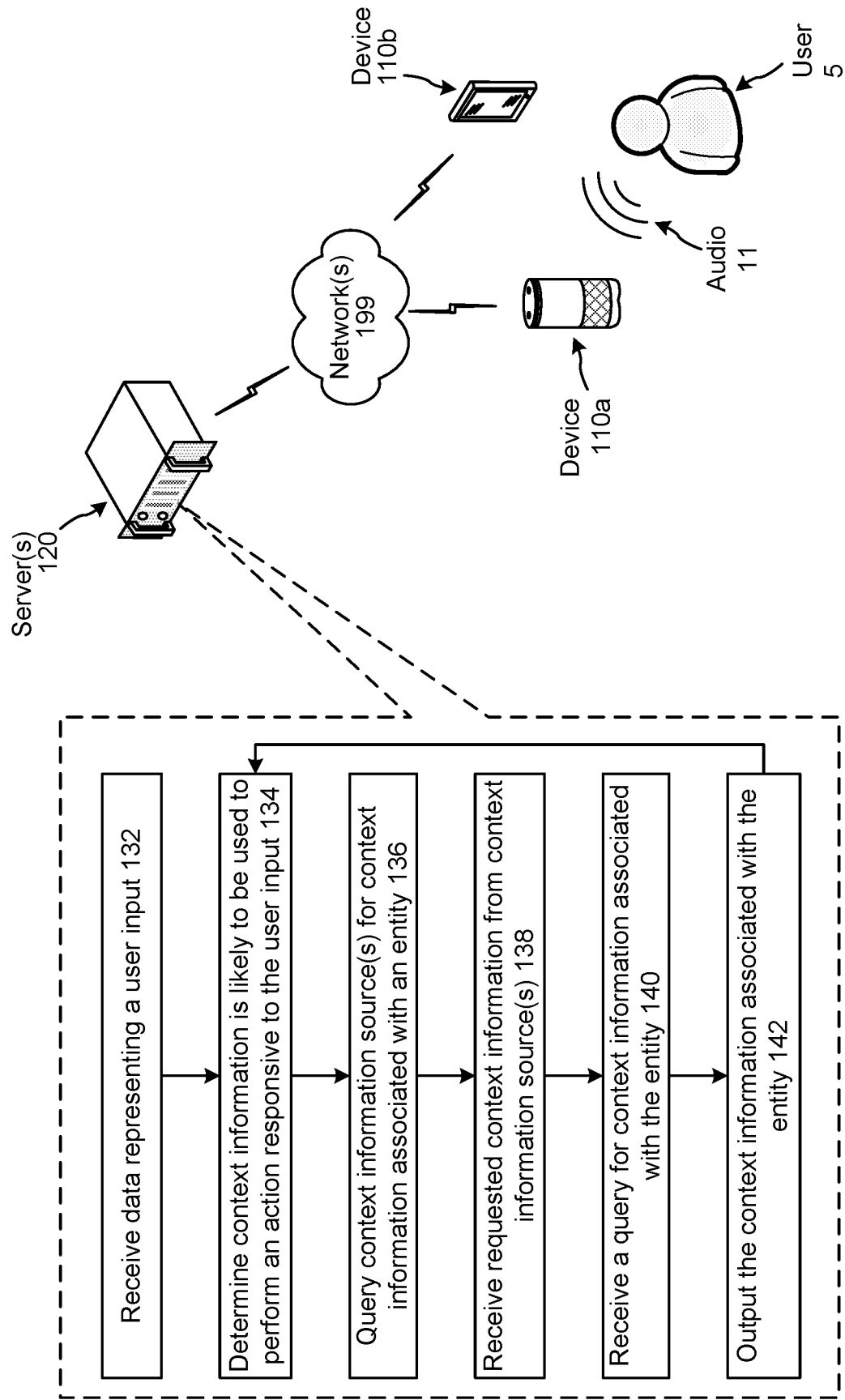
FIG. 1 illustrates a system configured to obtain context information according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions responsive to user inputs. For example, for the user input of "Alexa, play Adele music," a system may output music sung by an artist named Adele. For further example, for the user input of "Alexa, what is the weather," a system may output synthesized speech representing weather information for a geographic location of the user. In a further example, for the user input of "Alexa, make me a reservation," a system may book a reservation with an online reservation system of the user's favorite restaurant.

A system may use context information when determining how to respond to a user input. As used herein, "context information," "contextual information," and derivatives thereof, refer to information about or provided by an entity at a particular point in time. An "entity" here can refer to a person, time, place, device, or the like where the entity's information may provide context information that may impact user input processing. Such context information may be used to interpret and/or execute a user command. As an example, when a system receives a user input requesting a light in a room of a house be turned on, there may be some contextual information surrounding the user input, such as whether the user whispered the user input (e.g., whereby this information could be contextual information for the user that spoke the user input or the device that captured the user input), whether the user was a member of a pay-for service at the time the user input was received, whether other users are present, etc. Context information is to be contrasted with "static information," which is invariant to any specific situation. Examples of static information include measurements of physical items, dates of birth of individuals, etc. Static information may also be used to interpret and/or execute a user command.

A system may include various components that are invoked between when a user input is received and when an action, responsive to the user input, is performed. Each component may consider different context information. For example, an ASR component may consider a first set of a user's preferences to perform ASR processing, an NLU component may consider a second set of the user's preferences to perform NLU processing, a skill may consider a third set of the user's preferences to perform processes, etc.

A "skill," "skill component," and the like may be software running on a server(s) that is akin to a software application running on a traditional computing device. A skill may enable the server(s) to execute specific functionality in order to provide data or produce some other requested output. When a skill is invoked, the skill may request context information so the skill can perform an action that is tailored to the user input and its surrounding context.

In at least some examples, a "skill," "skill component," and the like may be software running on a computing device, similar to a traditional software application running on a computing device. Such skill may include a voice user interface in addition to or instead of, in at least some instances, a graphical user interface, smart home device interface, and/or other type of interface.

In at least some examples, more than one context information source may need to be called to provide desired context information whether explicitly requested or implicitly desired for command interpretation and/or execution. For example, if a component of a system requests context information regarding a user's sports team preferences, the system may identify the user's sports team preferences in the user's profile, may identify which sports teams the user referred to in previous user inputs, may determine which city the user lives in, etc.

The present disclosure improves systems by providing a universal context aggregator configured to obtain context information that may be used to perform various processes with respect to a user input. The aggregator can be implemented with respect to various different context information sources and, thereby, can universally access different types of context information.

The aggregator may have access to data representing what context information components of the system routinely request in various situations. When a particular situation is present, prior to being queried, the aggregator may obtain context information that is likely (e.g., the aggregator has at least a minimum confidence that such context information is) to be used to process a user input. Such obtaining of context information enables the aggregator to provide context information quicker in response to a query and, thereby, may decrease an amount of time between when a user input is received and when an action is performed in response to the user input.

The aggregator may be preconfigured with a data framework of entities with various types of relationships between the entities. At runtime, the aggregator may receive a query for context information associated with a specific entity. In response, the aggregator may aggregate various context information by traversing the data framework using the relationships. For example, the data framework may represent a device field is associated with a user field, the user field may be associated with a group account (e.g., family account) field, the group account field may be associated with various individual user profile fields, etc. If the aggregator is queried for context information with respect to a device, the aggregator may determine a user profile with respect to which the device is registered, may determine a group profile to which the user profile (and/or a specific user) belongs, may determine individual user profiles encompassed within the group profile, and may determine user preferences in the user profiles. The aggregator may then provide the aggregated context information to the component of the system that queried the aggregator. For further example, the data framework may represent a device is associated with an account representing other devices. If the aggregator is queried for context information with respect to a device, the aggregator may determine other devices represented in a same account, and may determine a context for each of the devices (e.g., whether a device detects presence of a user, whether a device is outputting content such as music or video, etc.). Other entities and relationships may be represented in the data framework. If the aggregator obtains at least some context information, a time between receiving a query and outputting results to the querying source may be reduced.

FIG. 1 illustrates a system configured to obtain context information. Although the figures and discussion herein illustrate certain operational steps of the system in a particular order, the steps described may be performed in a different order (as well as certain steps removed or added) without departing from the intent of the disclosure. As illustrated in FIG. 1, the system may include one or more devices (110a/110b) local to a user 5, and one or more servers 120 connected to the devices (110a/110b) across one or more networks 199.

The device 110a may receive audio 11 representing a spoken user input of the user 5. The device 110a may generate audio data representing the audio 11 and send the audio data to the server(s) 120, which the server(s) 120 receives (132).

The device 110b may receive a text input representing a text-based user input of the user 5. The device 110b may generate text data representing the text input and may send the text data to the server(s) 120, which the server(s) 120 receives (132).

Depending on configuration, the device 110 may send audio data or text data to the server(s) 120 via a companion application installed on the device 110. The companion application may enable the device 110 to communicate with the server(s) 120 via the network(s) 199. An example of a companion application is the Amazon Alexa application that operates on a phone/tablet.

After the server(s) 120 receives the data representing the user input, the server(s) 120 may determine (134) context information is likely to be used to perform an action responsive to the user input. For example, the server(s) 120 may have at least a minimum confidence that an ASR component will request a first set of user preferences, have at least a minimum confidence that an NLU component will request a second set of user preferences, have at least a minimum confidence that a skill (associated with NLU results) will request a third set of user preferences, etc.

The server(s) 120 may query (136) one or more context information sources for context information associated with an entity and, thereafter, receive (138), from the one or more context information sources, requested context information. Such context information may include user preferences, device settings, present device states, etc.

The server(s) 120 may thereafter receive (140) a query for context information associated with the entity. In response to receiving the query, the server(s) 120 may output (142) the context information associated with the entity. By obtaining the context information, the server(s) 120 may be able to output the context information quicker in response to receiving the query for the context information.

The processes described with respect to steps 134-142 may be performed more than once during the processing of a single user input. For example, the server(s) 120 may determine first context information is likely to be used to perform ASR processing (e.g., the server(s) 120 may have at least a minimum confidence that the first context information will be used to perform ASR processing), and may obtain such context information prior to an ASR component requesting same. For further example, the server(s) 120 may determine second context information is likely to be used to perform NLU processing (e.g., the server(s) 120 may have at least a minimum confidence that the second context information will be used to perform NLU processing), and may obtain such context information prior to an NLU component requesting same.

Figure 2:
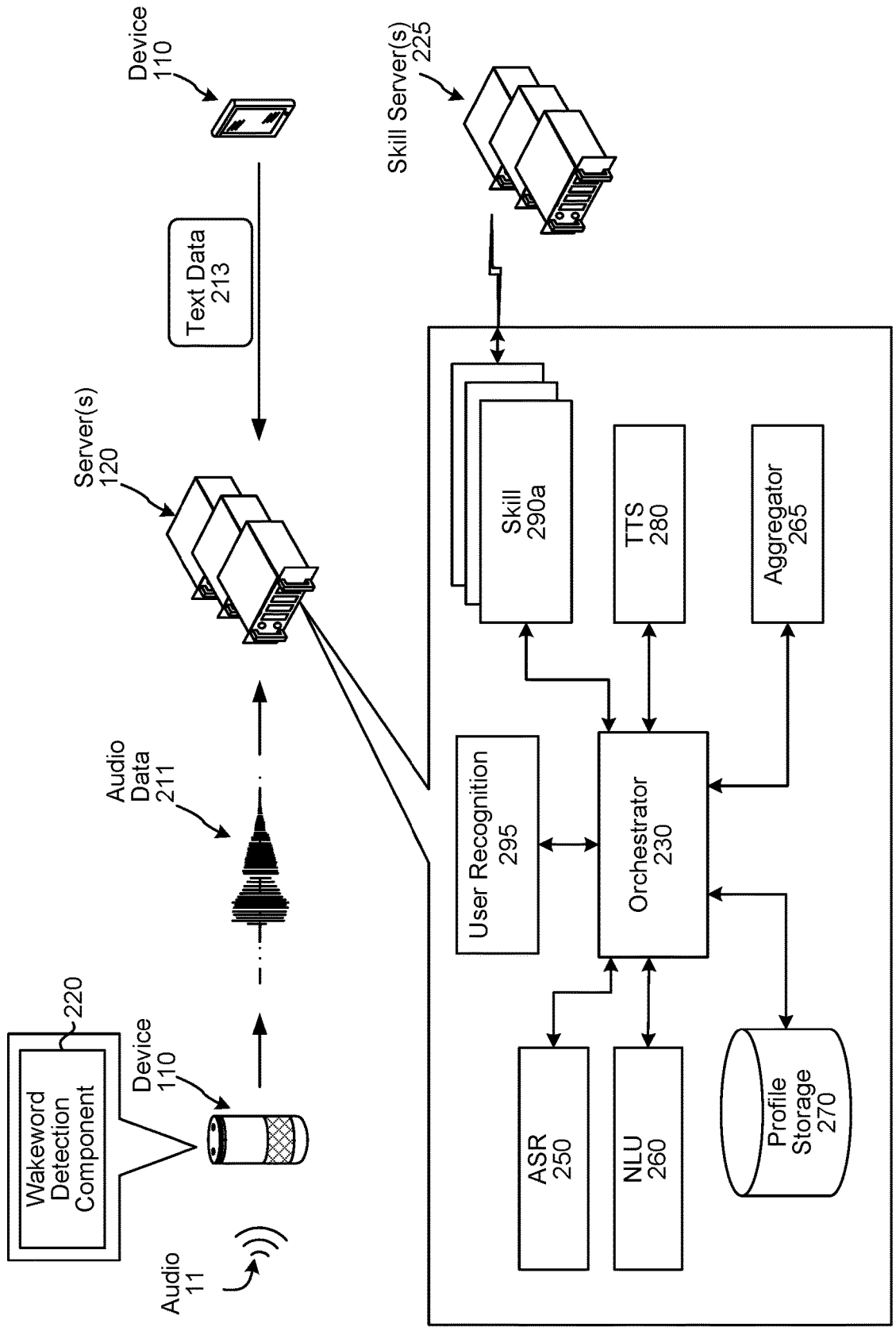
FIG. 2 is a conceptual diagram of components of a system according to embodiments of the present disclosure.

The system may operate using various components as illustrated in FIG. 2. The various components may be located on same or different physical devices. Communication between various components may occur directly or across a network(s) 199.

An audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. An example wakeword is "Alexa."

Wakeword detection is typically performed without performing linguistic analysis, textual analysis, or semantic analysis. Instead, the audio data representing the audio 11 is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the server(s) 120. The audio data 211 may include data corresponding to the wakeword, or the portion of the audio data 211 corresponding to the wakeword may be removed by the device 110 prior to sending the audio data 211 to the server(s) 120.

Upon receipt by the server(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 sends the audio data 211 to an ASR component 250. The ASR component 250 transcribes the audio data 211 into text data. The text data output by the ASR component 250 represents one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 sends the text data generated thereby to an NLU component 260, for example via the orchestrator component 230. The text data output by the ASR component 250 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

The device 110 may send text data 213 to the server(s) 120. Upon receipt by the server(s) 120, the audio data 213 may be sent to the orchestrator component 230, which may send the text data 213 to the NLU component 260.

The NLU component 260 attempts to make a semantic interpretation of the phrase(s) or statement(s) represented in the text data input therein. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the server(s) 120, a skill component 290, a skill server(s) 225, etc.) to execute the intent. For example, if the text data corresponds to "play Adele music," the NLU component 260 may determine an intent that the system output music and may identify "Adele" as an artist. For further example, if the text data corresponds to "what is the weather," the NLU component 260 may determine an intent that the system output weather information associated with a geographic location of the device 110. In another example, if the text data corresponds to "turn off the lights," the NLU component 260 may determine an intent that the system turn off lights associated with the device 110 or the user 5.

The NLU component 260 may send NLU results data (which may include tagged text data, indicators of intent, etc.) to the orchestrator component 230. The orchestrator component 230 may send the NLU results data to a skill component(s) 290 configured to perform an action at least partially responsive the user input. The NLU results data may include a single NLU hypothesis, or may include an N-best list of NLU hypotheses.

A "skill component" may be software running on the server(s) 120 that is akin to a software application running on a traditional computing device. That is, a skill component 290 may enable the server(s) 120 to execute specific functionality in order to provide data or produce some other requested output. The server(s) 120 may be configured with more than one skill component 290. For example, a weather service skill component may enable the server(s) 120 to provide weather information, a car service skill component may enable the server(s) 120 to book a trip with respect to a taxi or ride sharing service, a restaurant skill component may enable the server(s) 120 to order a pizza with respect to the restaurant's online ordering system, etc. A skill component 290 may operate in conjunction between the server(s) 120 and other devices, such as the device 110, in order to complete certain functions. Inputs to a skill component 290 may come from speech processing interactions or through other interactions or input sources. A skill component 290 may include hardware, software, firmware, or the like that may be dedicated to a particular skill component 290 or shared among different skill components 290.

In addition or alternatively to being implemented by the server(s) 120, a skill component 290 may be implemented at least partially by a skill server(s) 225. Such may enable a skill server(s) 225 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The server(s) 120 may be configured with a single skill component 290 dedicated to interacting with more than one skill server 225.

Unless expressly stated otherwise, reference to a skill, skill device, or skill component may include a skill component 290 operated by the server(s) 120 and/or the skill server(s) 225. Moreover, the functionality described herein as a skill may be referred to using many different terms, such as an action, bot, app, or the like.

The server(s) 120 may include a TTS component 280 that generates audio data (e.g., synthesized speech) from text data using one or more different methods. Text data input to the TTS component 280 may come from a skill component 290, the orchestrator component 230, or another component of the system.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The server(s) 120 may include profile storage 270. The profile storage 270 may include a variety of information related to individual users, groups of users, devices, etc. that interact with the system. A "profile" refers to a set of data associated with a user, device, etc. The data of a profile may include preferences specific to the user, device, etc.; input and output capabilities of the device; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices of the user.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device identifiers representing one or more devices associated with the group profile.

The profile storage 270 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

The server(s) 120 may include a user recognition component 295 that recognizes one or more users associated with data input to the system. The user recognition component 295 may take as input the audio data 211. The user recognition component 295 may perform user recognition by comparing audio characteristics in the audio data 211 to stored audio characteristics of users. The user recognition component 295 may also or alternatively perform user recognition by comparing biometric data (e.g., fingerprint data, iris data, etc.), received by the system in correlation with the present user input, to stored biometric data of users. The user recognition component 295 may also or alternatively perform user recognition by comparing image data (e.g., including a representation of at least a feature of a user), received by the system in correlation with the present user input, with stored image data including representations of features of different users. The user recognition component 295 may perform additional user recognition processes, including those known in the art. For a particular user input, the user recognition component 295 may perform processing with respect to stored data of users associated with the device that captured the user input.

The user recognition component 295 determines whether user input originated from a particular user. For example, the user recognition component 295 may generate a first value representing a likelihood that the user input originated from a first user, a second value representing a likelihood that the user input originated from a second user, etc. The user recognition component 295 may also determine an overall confidence regarding the accuracy of user recognition operations.

The user recognition component 295 may output a single user identifier corresponding to the most likely user that originated the user input. Alternatively, the user recognition component 295 may output an N-best list of user identifiers with respective values representing likelihoods of respective users originating the user input. The output of the user recognition component 295 may be used to inform NLU processing, processing performed by a skill component 290, as well as processing performed by other components of the system.

The server(s) 120 may include an aggregator component 265 that aggregates context information from various sources. The aggregator component 265 may include a load balancer 310 and various computing resources 320 (as illustrated in FIG. 3).

The aggregator component 265 may receive numerous queries for context information at any given moment. The context service 320 may be configured with a plurality of computing resources 320 (e.g., hosts) to provide the aggregator component 265 with enough computing power to handle such queries in a timely manner. The load balancer 310 is configured to distribute workloads across the computing resources 320, to ensure processing of a query is not unnecessarily delayed due to high system load.

While the aggregator component 265 may primarily aggregate context information at runtime, the aggregator component 265 may secondarily store context information that is not stored in storage by some other component of the system. For example, the aggregator component 265 may store information generated by the system for a user input, such as ASR hypotheses, NLU results, a global positioning system (GPS) location of the device 110 from which the user input was received, data representing a service (or other system component) having control of content presented on a display of a device 110, etc.

Figure 3:
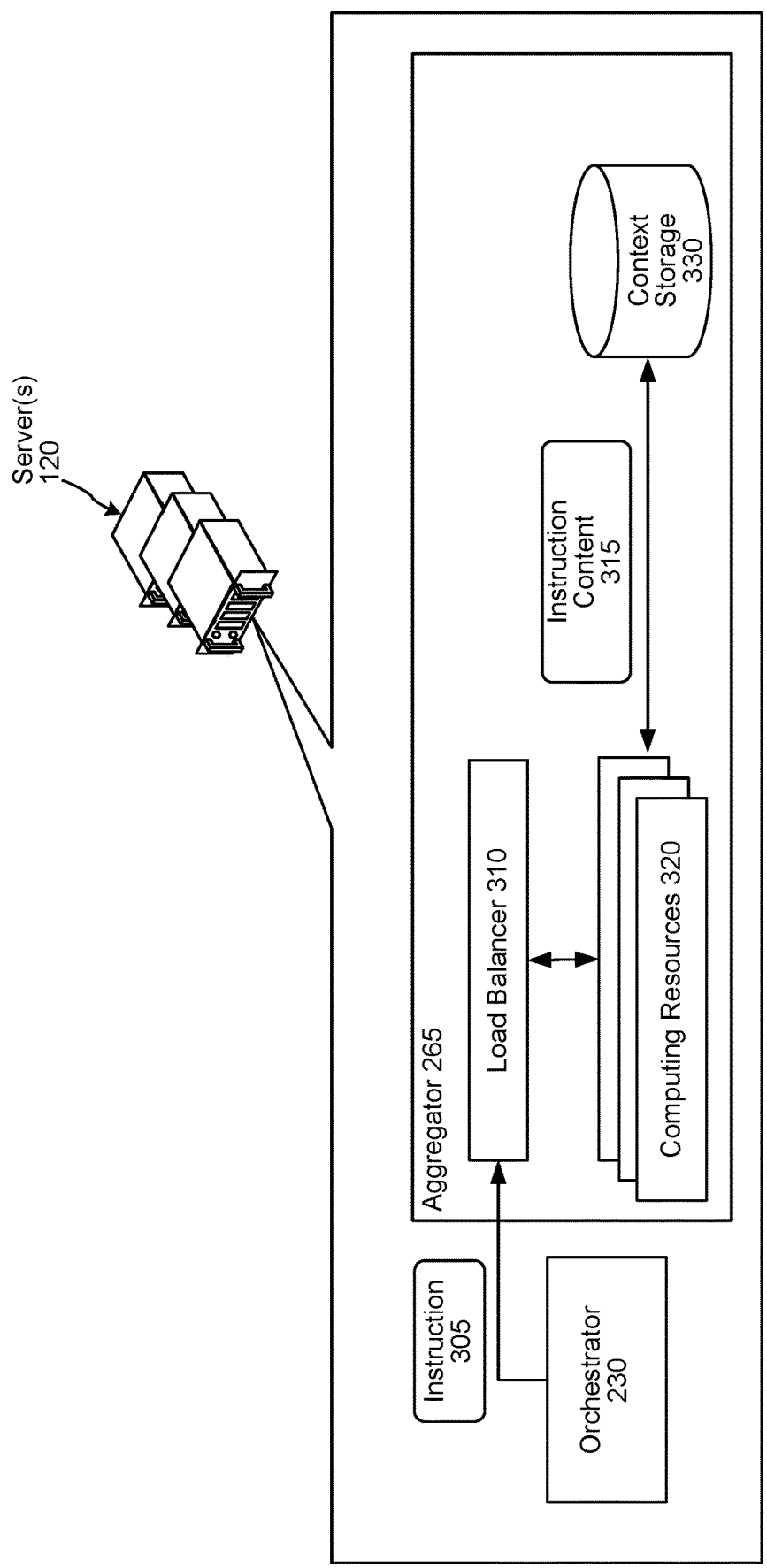
FIG. 3 is a conceptual diagram illustrating how context information may be stored in response to an instruction to store context information according to embodiments of the present disclosure.

FIG. 3 illustrates how the aggregator component 265 may store context information in response to an instruction 305 to store context information. The orchestrator component 230 (or some other component of the system) may send, to the aggregator component 265, the instruction 305 via a particular application program interface (API) of the aggregator component 265. The instruction 305 may include context information to be stored by the aggregator component 265, as well as various parameters (e.g., user identifier, device identifier, user input identifier etc.) associated with the context information. A user input identifier may be generated by a device 110 (that captured the user input). A user input identifier may be used by the system to maintain a record of various processing performed with respect to a user input.

The load balancer 310 assigns the instruction 305 to one or more of the computing resources 320. The one or more computing resources 320 process the instruction 305 to determine the entity/entities represented in the instruction 305. Thereafter, the one or more computing resources 320 store an association between the entity/entities and the context information (represented as instruction content 315 in FIG. 3) in context storage 330.

The storing of context information, as described with respect to FIG. 3, may occur more than once with respect to a single user input. For example, first context information for a user input may be stored to context storage 330 after the user input is received but prior to ASR processing being performed (whereby such context information may represent a device identifier of the device that captured the user input, a type of the device, what account the device belongs to, etc.), second context information for the user input may be stored to context storage 330 after ASR processing is performed but prior to NLU processing being performed, third context information for the user input may be stored to context storage 330 after NLU processing is performed but prior to a skill being invoked, etc. As such, one skilled in the art will appreciate that context storage 330 may be updated (one or more times) for a given user input as the system learns more context information from processing performed with respect to the user input.

In addition to receiving instructions to store context information from the orchestrator component 230 (or another component of the system), the aggregator component 265 may receive context information queries from the orchestrator component 230 (or another component of the system). Whereas an instruction to store context information results in context information being stored by the aggregator component 265, a context information query requests context information from the aggregator component 265.

Figure 4:
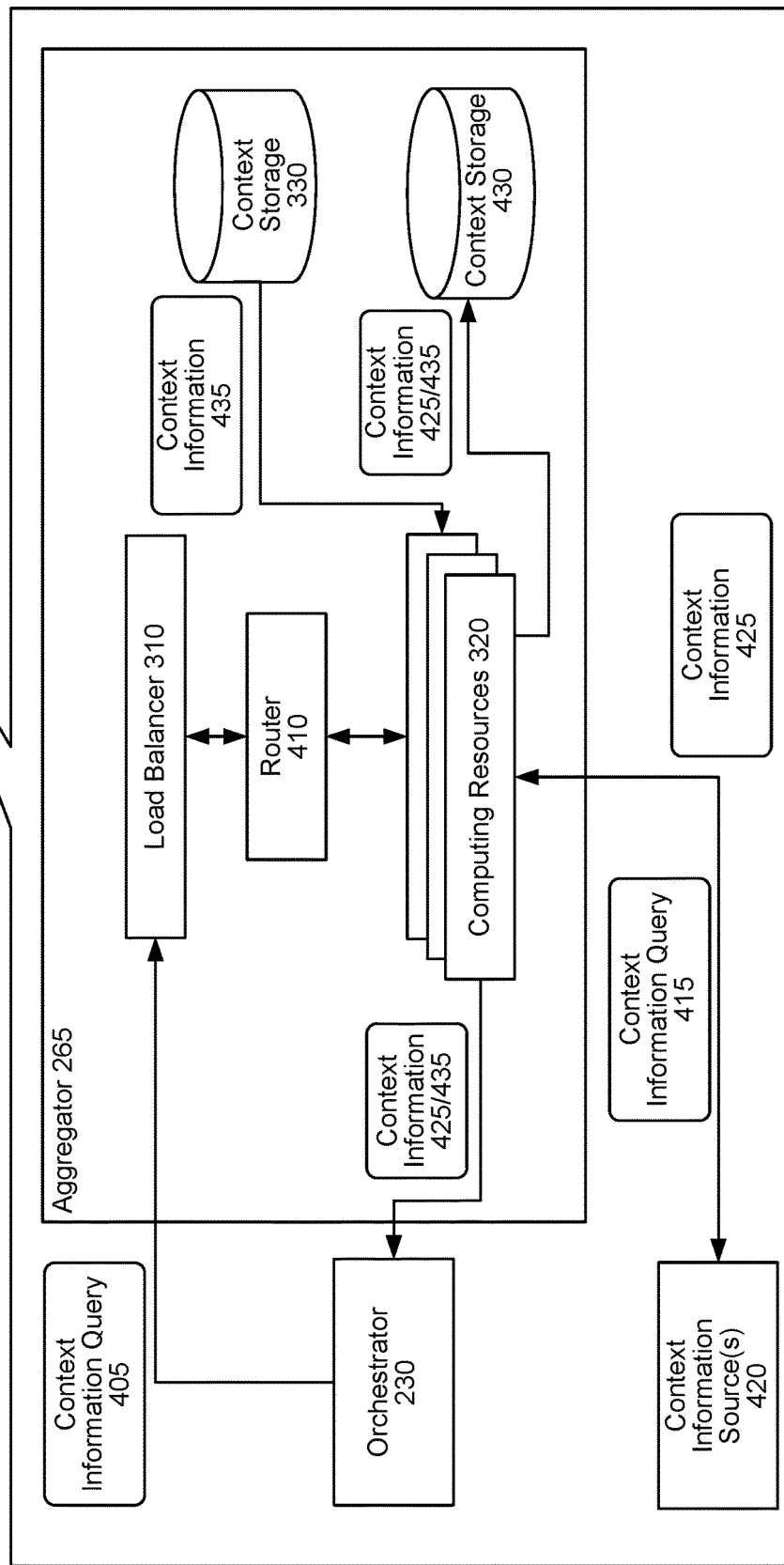
FIG. 4 is a conceptual diagram illustrating components for aggregating context information in response to a context information query according to embodiments of the present disclosure.

FIG. 4 illustrates how the aggregator component 265 may process a context information query 405 requesting context information for a particular entity or user input. The context information query 405 may be sent to the load balancer 310. The load balancer 310 may assign the context information query 405 to one or more computing resources 320 based on a present load of the computing resources 320.

The aggregator component 265 may receive multiple context information queries associated with the same entity. Moreover, more than one of these context information queries may be received by the aggregator component 265 between a time when one or more computing resources 320 are called to process one of the context information queries and when the one or more computing resources 320 outputs the requested context information. The context service 320 may include a router 410 that acts as a secondary load balancer to the load balancer 310. That is, the router 410 may determine one or more computing resources 320 are currently processing to aggregate context information associated with the entity or user input associated with the context information query 405. If none of the computing resources 320 are currently processing as such, the router 410 may let the load balancer 310's assignment stand. Conversely, if the router 410 determines one or more computing resources 320 are currently aggregating the requested content information, the router 410 may reassign the context information query 405 to those one or more computing resources 320. The foregoing decisions of the router 410 may be based on job statuses associated with processes performed by one or more computing resources 320. This prevents the computing resources 320 from duplicating queries to the same context information source(s), for the same context information (e.g., thereby decreasing load on downstream context information sources). Moreover, as a result of such reassignment, the computing resources 320 are able to output context information, in response to multiple context information queries, even if processing for one context information query began prior to receipt of a second context information query requesting the same context information. As a result, context information may be provided to the source of the second context information query faster than if the computing resources 320 separately called one or more context information sources in response to the second context information query.

Figure 5:
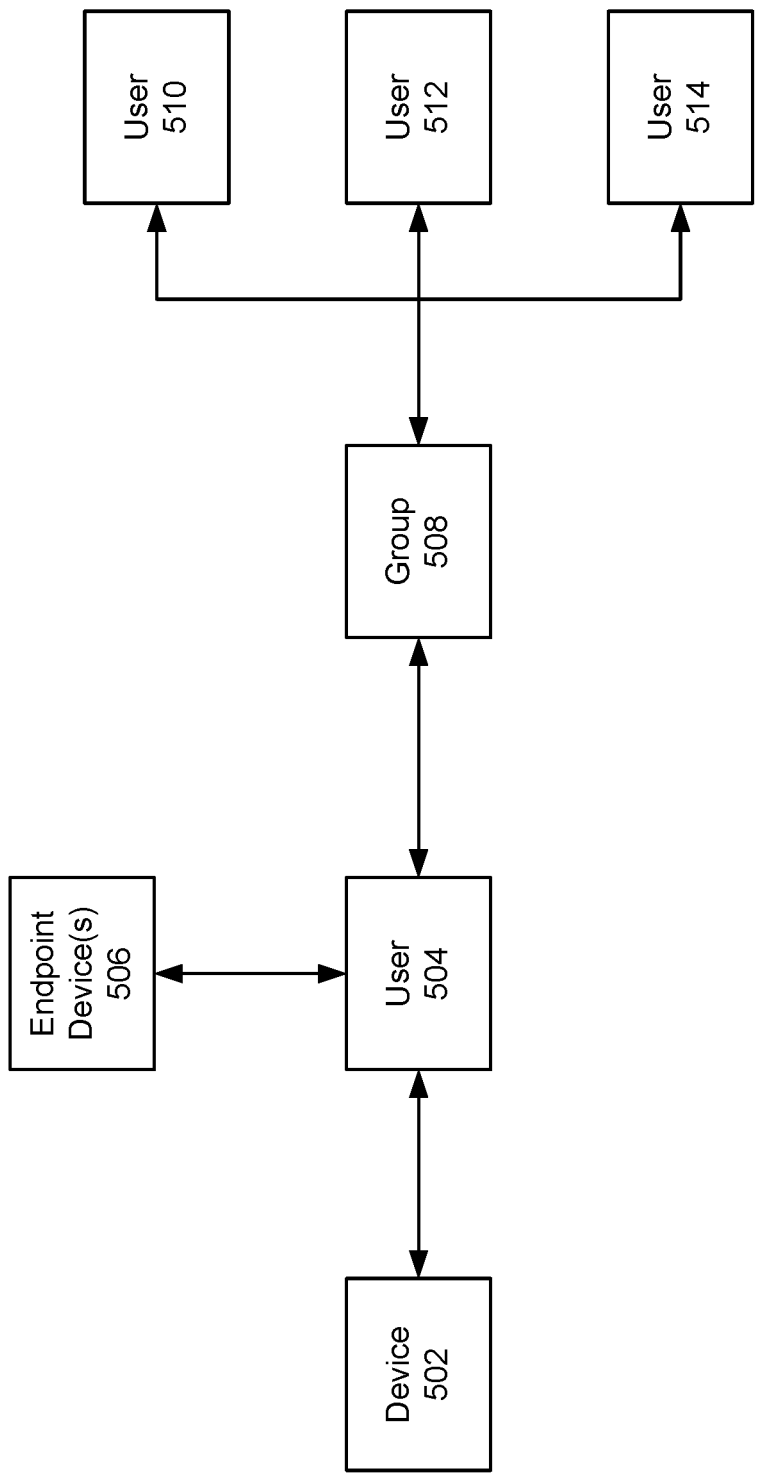
FIG. 5 is a conceptual diagram illustrating an example data framework for aggregating context information according to embodiments of the present disclosure.

The computing resources 320 may be associated with a preconfigured data framework of entities and relationships (or may have a plurality of preconfigured data frameworks). The data framework may be generated offline, and used by the computing resources 320 at runtime. As illustrated in FIG. 5, for example, the data framework may represent a device 502 is associated with a user 504. A user 504 may be associated with one or more endpoint devices (collectively illustrated as endpoint device(s) 506). A user 504 may be associated with a group 508 that includes various users 510, 512, and 514. The data framework may also include nodes representing substance of the user input. One skilled in the art will appreciate that the data framework of FIG. 5 is merely illustrated, and that data frameworks of different entities and relationships may be implemented.

Referring back to FIG. 4, the one or more computing resources 320 (either determined by the load balancer 310 or the router 410) may use the entity or user input parameter (represented in the context information query 405) as a starting point to traverse the data framework to determine different types of related entities. Using FIG. 5 as an example, if the context information query 405 requests information associated with a particular user identifier (which would map to user 504 in the data framework), the one or more computing resources of the context service 320 may determine one or more endpoint device identifier (which would map to endpoint devices 506 in the data framework) associated with the user identifier, a group identifier (which would map to group 508 in the data framework) associated with the user identifier, and one or more other user identifiers associated the group identifier (which would map to user 510, user 512, and user 514 in the data framework).

The one or more computing resources 320 may determine, for each entity, at least one context information source 420. The context information source(s) 420 may have access to various types of context information including, for example, information representing which users of the system are subscribed to one or more pay-for services of the system, information representing IP addresses associated with devices from which user inputs were received, information representing electronic calendar events, information representing types of music a particular user has listened to over a previous amount of time (e.g., the last 30 days), demographic information of system users (e.g., birthdate, gender, education, etc. as represented in user profiles) etc. In general, the context information source(s) 420 may provide context information that may be used by various components of the system in performing their respective processes. A context information source 420 may be a storage containing context information, or may be a computer processing component in communication with such a storage. While FIG. 4 illustrates the context information source(s) 420 being implemented by the server(s) 120, one skilled in the art will appreciate that some or all of the context information source(s) 420 may not be implemented by, but may be in communication with, the server(s) 120.

The one or more computing resources 320 may send a context information query 415 to each determined context information source 420. The context information query 415, sent to a particular context information source 420, may represent one or more entity identifiers for each of the one or more entity types determined while traversing the data framework. The identifiers may correspond to one or more device identifiers, one or more user identifiers, one or more user input identifiers, etc. The one or more computing resources 320 may receive context information 425 from each queried context information source 420.

The one or more computing resources 320 may also query context storage 330 for context information 435 stored to context storage 330 in response to an instruction to store context information (as described above with respect to FIG. 3). The one or more computing resources 320 may query context storage 330 with respect to the same identifier(s) that the one or more computing resources send to the context information source(s) 420.

The one or more computing resources 320 store the context information (425/435) in context storage 430. The context information stored in context storage 430 may represent a source (e.g., a contest information source) from which the context information was received, one or more identifiers of the one or more computing resources 320 used to obtain the context information, a type of the context information, etc. While it has been illustrated and described that proactively stored context information is stored in context storage 330 and context information, aggregated in response to a context information query, is stored in context storage 430, a same storage for both types of context information may be used in at least some examples.

The one or more computing resources 320 may also send the context information (425/435) to the component(s) of the system that originated context information queries requesting the context information. In some examples, the one or more computing resources 320 may send the context information (425/435) to the orchestrator component 230, which may route the context information (425/435) to the system components that requested the information. The context information (425/435) may be sent to the system component that sent the context information query 405. The context information (425/435) may also be sent to one or more system components that sent context information queries (requesting the same or similar context information as the context information query 405) after the context information query 405 was received, but prior to the context information (425/435) being received by the context service 320 (e.g., context information queries reassigned by the router 410).

The aggregation of context information, as described with respect to FIG. 4, may occur more than once with respect to a single user input. For example, the aggregator component 265 may receive a first query for context information to be used to perform ASR processing with respect to a user input, a second query for context information to be used to perform NLU processing with respect to the user input, a third query for context information to be used to select a skill to be invoked with respect to the user input, a fourth query for context information to be used by the skill to perform an action responsive to the user input, etc. For further example, the aggregator component 265 may receive a first query for context information to be used to perform NLU processing of a user input by a first NLU domain, a second query for context information to be used to perform NLU processing of the user input by a second NLU domain, etc.

In at least some example, the aggregator component 265 may associate received data with a corresponding user input identifier for later recall. For example, when the aggregator component 265 prefetches context information to be used for ASR processing, the aggregator component 265 may associate the context information with a corresponding user input identifier in storage. Thereafter, if the ASR component 250 requests context information for the user input identifier, the aggregator component 265 is able to recall the appropriate context information (e.g., the context information associated with the user input identifier) from storage. For further example, when the aggregator component 265 prefetches context information to be used for NLU processing, the aggregator component 265 may associate the context information with a corresponding user input identifier in storage. Thereafter, if the NLU component 260 requests context information for the user input identifier, the aggregator component 265 is able to recall the appropriate context information from storage. Other examples are possible.

The aggregator component 265 may receive queries for context information for different user inputs and for different stages of user input processing. The aggregator component 265 may also receive published events, such as those representing a user has recently enabled a skill. The aggregator component 265 may obtain context information when the aggregator component 265 anticipates context information may be used during processing of a user input. For example, in response to receiving a published event representing a user has recently enabled a skill, the aggregator component 265 may obtain context information that may be used by the skill to process a user input of the user.

Figure 6:
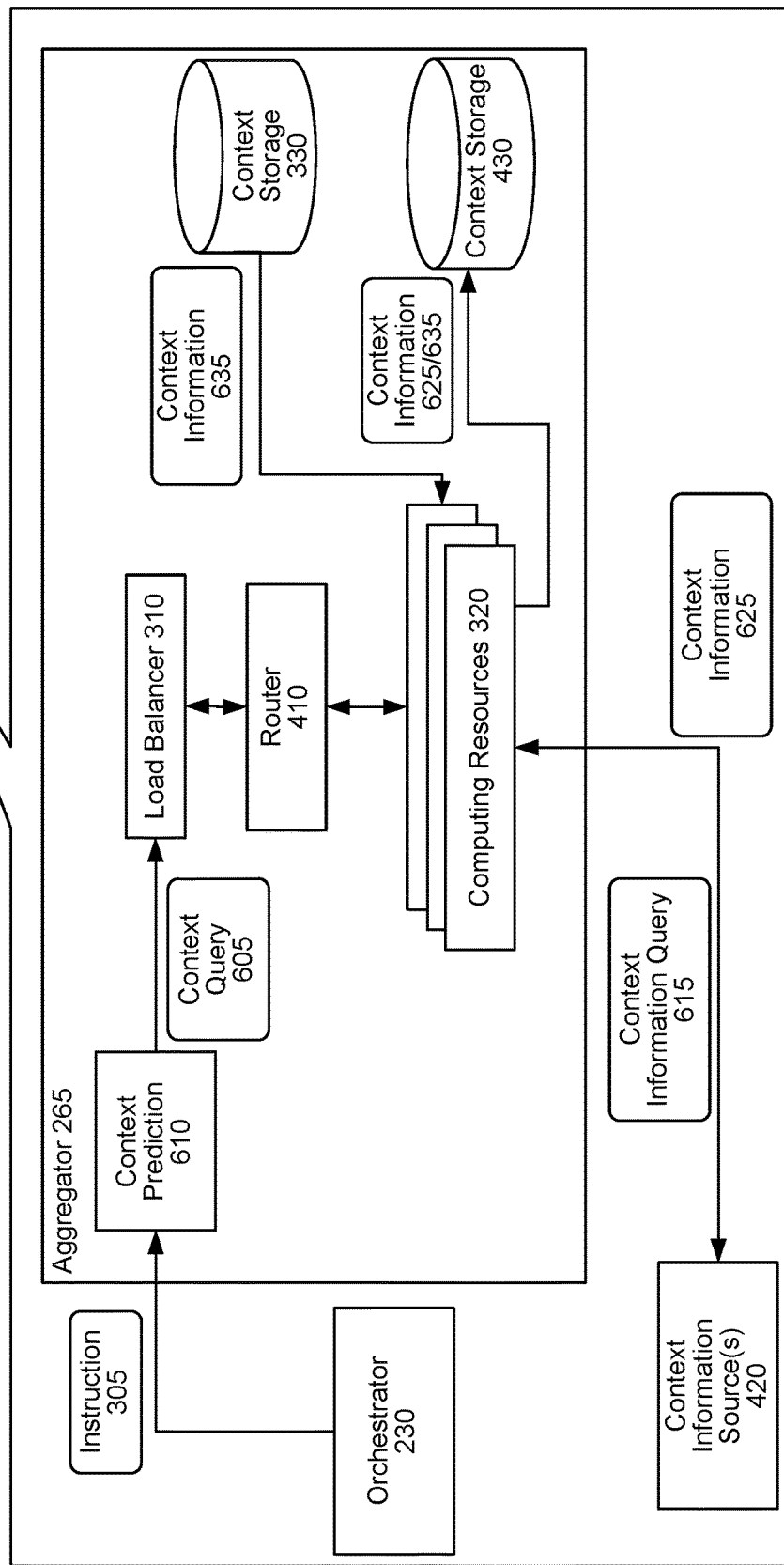
FIG. 6 is a conceptual diagram illustrating components for obtaining context information prior to receiving a context information query according to embodiments of the present disclosure.

FIG. 6 illustrates how the aggregator component 265 may obtain context information. The aggregator component 265 may include a context prediction component 610. The context prediction component 610 may be configured to receive all instructions to store context information sent to the aggregator component 265 and determine, for each instruction, whether it is likely that context information will be used to process a user input. For example, if the aggregator component 265 receives an instruction to store context information representing a new user input (e.g., including a device identifier, information representing a device type, and a user input identifier), the context prediction component 610 may determine it is likely (e.g., may determine at least a minimum confidence) that context information will be used in ASR processing. In another example, if the aggregator component 265 receives an instruction to store context information representing ASR results, the context prediction component 610 may determine it is likely (e.g., may determine at least a minimum confidence) that context information will be used in NLU processing. In a further example, if the aggregator component 265 receives an instruction to store context information representing NLU results, the context prediction component 610 may determine it is likely (e.g., may determine at least a minimum confidence) that context information will be used to select a particular skill to perform an action responsive to the user input. Other examples are possible.

The context prediction component 610 may be configured with rules for analyzing instructions, to store context information, to determine what entity/entities will be the subject of subsequently used context information. For example, one or more rules may indicate that a user's age should be obtained when a new user input is represented in an instruction to store context information. For further example, one or more rules may indicate that a user's devices' output capabilities should be obtained when ASR results are represented in an instruction to store context information.

The context prediction component 610 may also or alternatively be configured to implement one or more trained machine learning models for analyzing instructions, to store context information, to determine when an entity (or entities) will be the subject of subsequently used context information. Over time, the system may gather data representing instructions to store context information and subsequently received context information queries. Offline, the system may use such data to train a machine learning model(s) to identify trends in content of instructions and content of subsequently received context information queries. The context prediction component 610 may implement the trained machine learning model(s) at runtime to process an instruction, to store context information, to determine when an entity (or entities) will be the subject of subsequently used context information.

The machine learning model(s) may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The context prediction component 610 may generate a context query 605. The context query 605 may be generated based on system usage of a present user. For example, the context prediction component 610 may receive an instruction 305 to store context information for a user input associated with a particular user, may identify the user's system usage history (e.g., the last N number of user inputs of the user), and may determine (based on the system usage history) that the present user input will invoke certain domains of the NLU component. In this example, the context query 605 may instruct downstream components to obtain context information to be used by the determined NLU domains. Other examples are possible.

The context prediction component 610 sends the context query 605 to the load balancer 310, which assigns the context query to one or more computing resources 320. The one or more computing resources 320 may send a context information query 615 to each context information source 420 that the one or more computing resources 320 determines has context information corresponding to the context query 605. The one or more computing resources 320 may receive context information 625 from the one or more queried context information sources 420.

The one or more computing resources 320 may also request, from context storage 330, context information 635 associated with the entity/entities in the context query 605.

The one or more computing resources 320 may store the context information (625/635) in context storage 430.

An instruction 305 to store context information representing a new user input (e.g., representing a device identifier, a type of device, a user input identifier, etc.) may be sent to the aggregator component 265 upon the device 110 detecting a spoken wakeword, but prior to the user finishing speaking of the user input. One skilled in the art will appreciate that the operations for obtaining context information described with respect to FIG. 6 may be completed prior to the user finishing speaking of the user input. This significantly reduces computing latency experienced in processing of a subsequently received context information query.

A user input may be received as part of a dialog between a user and the system. A dialog may correspond to various user inputs and system outputs. When the server(s) 120 receives a user input, the server(s) 120 may associate the data (e.g., audio data or text data) representing the user input with a session identifier. The session identifier may be associated with various speech processing data (e.g., an intent indicator(s), a category of skill to be invoked in response to the user input, etc.). When the system invokes the skill, the system may send the session identifier to the skill in addition to NLU results data. If the skills outputs data from presentment to the user, the skill may associate the data with the session identifier. The foregoing is illustrative and, thus, one skilled in the art will appreciate that a session identifier may be used to track data transmitted between various components of the system. A session identifier may be closed (e.g., a dialog between a user and the system may end) after a skill performs a requested action (e.g., after the skill causes content to be output to the user).

A user input, corresponding system processing, and system performance of an action responsive to the user input may be collectively referred to as a "turn." A single dialog may include multiple turns. The context information stored in context storage (330/430) may be stored across turns such that context information collected and used for a first turn may be recalled and used for a subsequent turn.

FIGS. 7A through 7C illustrate an example of how context information may be stored and aggregated for a turn of a dialog. The aggregator component 265 may receive (702), from the orchestrator component 230, data representing a spoken wakeword has been detected. Thereafter, the aggregator component 265 may determine (704) first context information to be used to perform ASR processing. The aggregator component 265 may receive (706), from the ASR component 250, a query for at least a portion of the first context information and, in response, may send (708), to the ASR component 250, the at least a portion of the first context information. Thereafter, the aggregator component 265 may receive (710), from the ASR component 250, ASR results and, based at least in part thereon, may determine (712) second context information to be used to perform NLU processing. The aggregator component 265 may receive (714), from the NLU component 260, a query for at least a portion of the second context information and, in response, may send (716) the at least a portion of the second context information. Thereafter, the aggregator component 265 may receive (718), from the NLU component 260, NLU results and, based at least in part thereon, may determine (720) third context information to be used to select a skill to invoke in response to a user input associated with the spoken wakeword. The aggregator component 265 may receive (722), from the orchestrator component 230, a query for at least a portion of the third context information and, in response, may send (724), to the orchestrator component 230, the at least a portion of the third context information. Thereafter, the aggregator component 265 may receive (726), from the orchestrator component 230, data representing a skill 290 to be invoked in response to the user input and, based at least in part thereon, may determine (728) fourth context information to be used by the skill 290 to perform an action responsive to the user input. The aggregator component 265 may receive (730), from the orchestrator component 230, a query for at least a portion of the fourth context information and, in response, may send (732), to the orchestrator component 230, the at least a portion of the fourth context information. The orchestrator component 230 may send the at least a portion of the fourth context information to the skill 290.

As described, the computing resource(s) 320 may query context storage (330/430) for context information in response to a context information query 405. Thus, it may be important for context storage (330/430) to include accurate context information.

Context information, stored in context storage (330/430), may become inaccurate. For example, context information may indicate a timer has been set for a user. Sometime after the context information is stored to storage, the timer may expire or the user may cancel the timer. This context information may become inaccurate once the timer expires or is canceled. Thus, the system may include techniques for invalidating context information that is no longer accurate.

Figure 8:
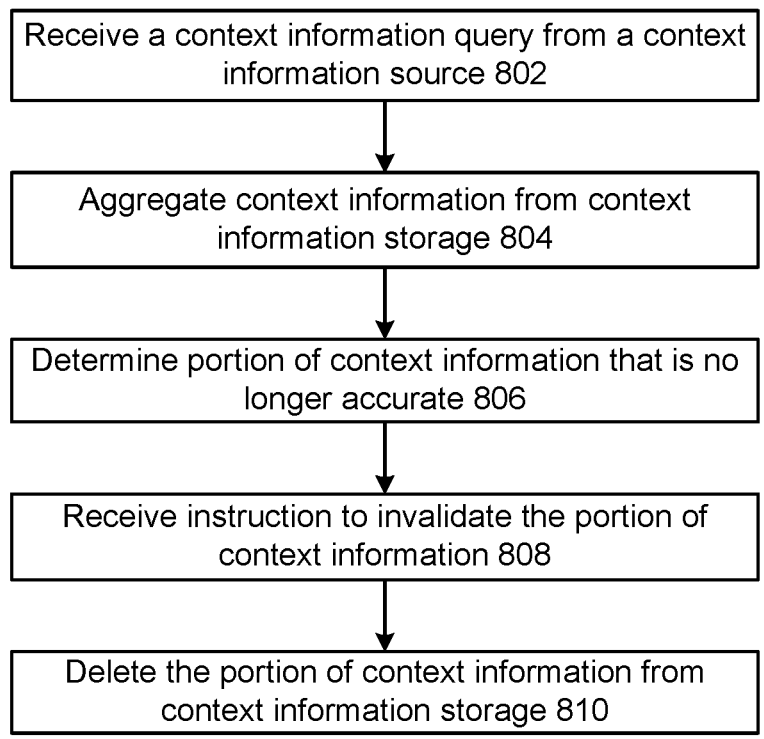
FIG. 8 is a process flow diagram illustrating an example of context information invalidation based on a query received from a context information source according to embodiments of the present disclosure.

In some examples, the system may be configured to invalidate context information in response to queries from context information sources (as illustrated in FIG. 8). The aggregator component 265 receives (802) a context information query from a context information source 420. The aggregator component 265 aggregates (804) context information, from context information storage (330/430), associated with the entity/entities represented in the context information query. The context information source 420 determines (806) a portion of the context information that is no longer accurate. Thereafter, the aggregator component 265 receives (808), from the context information source, an instruction to invalidate the portion of the context information 420. The aggregator component 265 thereafter deletes (810) the portion of context information from context information storage (330/430).

Figure 9:
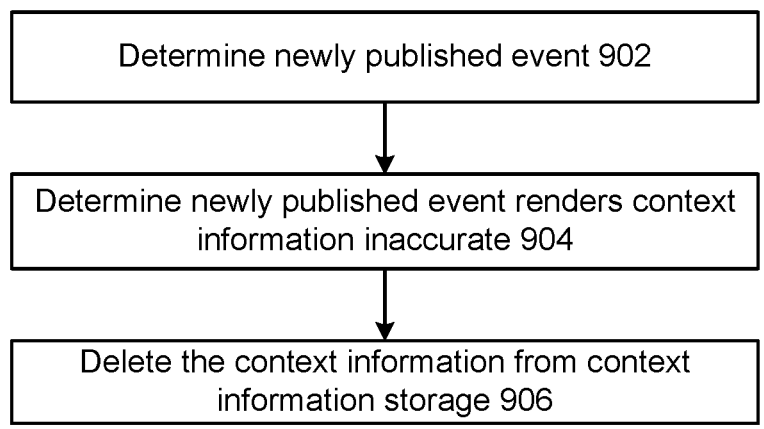
FIG. 9 is a process flow diagram illustrating an example of context information invalidation based on published events according to embodiments of the present disclosure.

In other examples, the system may be configured to invalidate context information based on published events (as illustrated in FIG. 9). Such may be beneficial because it decouples the need for a context information source 420 to know what context information has been stored by the aggregator component 265.

The aggregator component 265 may subscribe to one or more event buses (or other event publication source(s)) that publish skill-specific events, events representing changes in pay-for service subscriptions, events representing changes to user profiles, etc. The aggregator component 265 may monitor the event bus(es) for newly published events. When the aggregator component 265 determines (902) a newly published event, the aggregator component 265 determines whether the newly published event renders context information, in context information storage (330/430), inaccurate. For example, the aggregator component may determine a newly published event represents a timer has been canceled, and may determine the event renders stored timer context information inaccurate. If the aggregator component 265 determines (904) the newly published event renders context information inaccurate, the aggregator component 265 deletes (906) the context information from context information storage (330/430).

Figure 10:
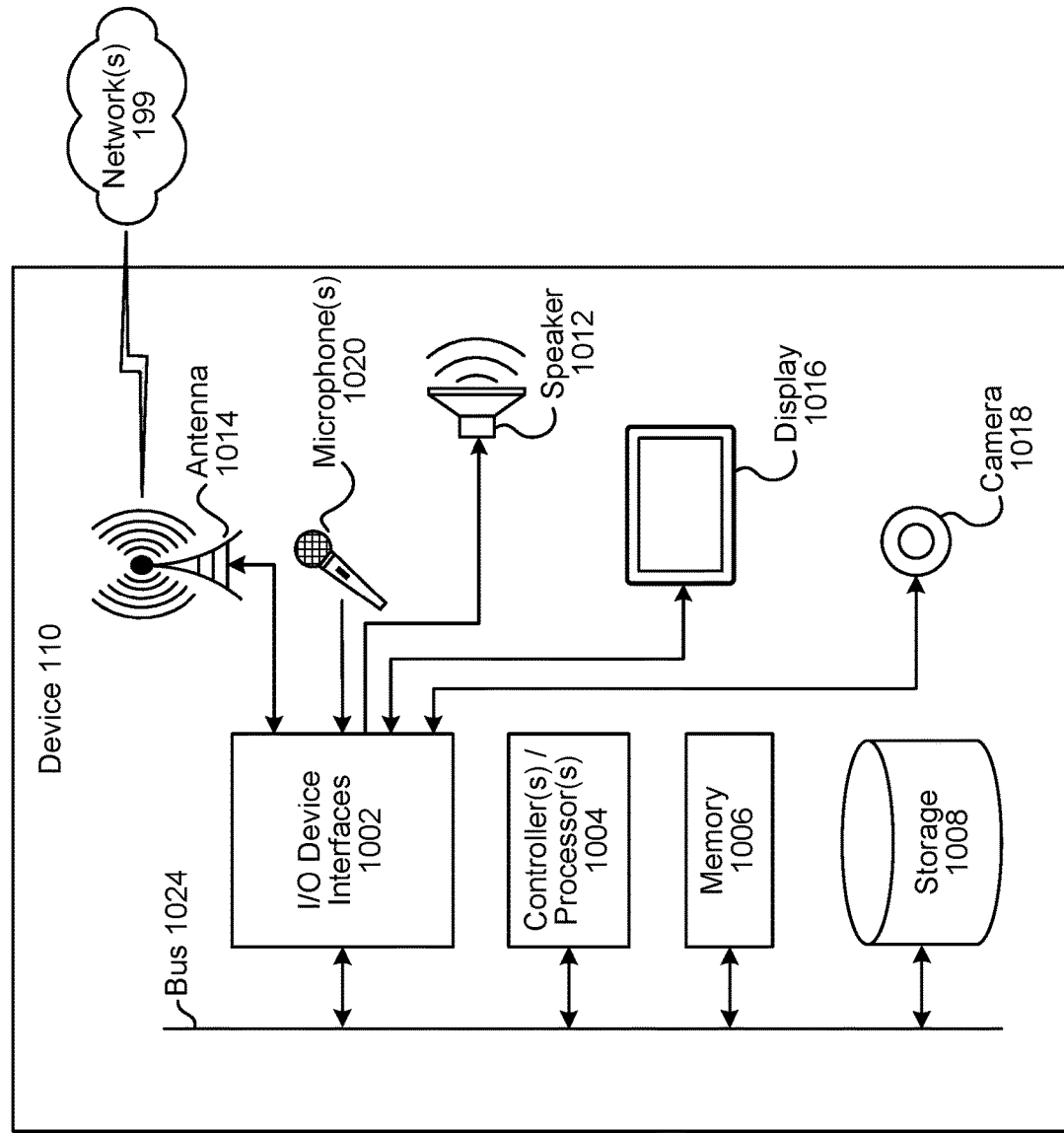
FIG. 10 is a block diagram conceptually illustrating example components of a device according to embodiments of the present disclosure.
Figure 11:
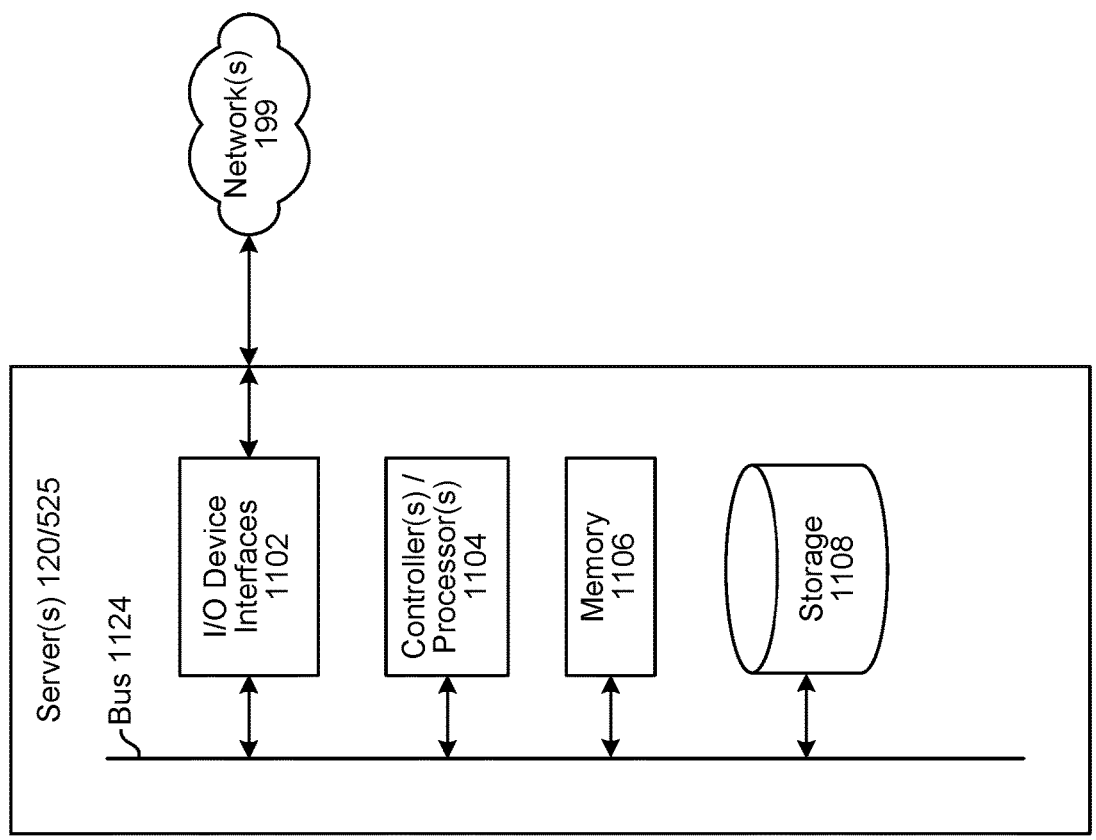
FIG. 11 is a block diagram conceptually illustrating example components of a server according to embodiments of the present disclosure.

FIG. 10 is a block diagram conceptually illustrating a device 110 that may be used with the system. FIG. 11 is a block diagram conceptually illustrating example components of a remote device, such as the server(s) 120, which may assist with ASR processing, NLU processing, etc., and the skill server(s) 225. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers (120/225) may be included in the system, such as one or more servers 120 for performing ASR processing, one or more servers 120 for performing NLU processing, one or more skill server(s) 225 for performing actions responsive to user inputs, etc. In operation, each of these devices (or groups of devices) may include computer-readable and computer-executable instructions that reside on the respective device (120/225), as will be discussed further below.

Each of these devices (110/120/225) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each device (110/120/225) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (1002/1102).

Computer instructions for operating each device (110/120/225) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120/225) includes input/output device interfaces (1002/1102). A variety of components may be connected through the input/output device interfaces (1002/1102), as will be discussed further below. Additionally, each device (110/120/225) may include an address/data bus (1024/1124) for conveying data among components of the respective device. Each component within a device (110/120/225) may also be directly connected to other components in addition to (or instead of) being connected to other components across the bus (1024/1124).

Referring to FIG. 10, the device 110 may include input/output device interfaces 1002 that connect to a variety of components such as an audio output component such as a speaker 1012, a wired headset or a wireless headset (not illustrated), or other component capable of outputting audio. The device 110 may also include an audio capture component. The audio capture component may be, for example, a microphone 1020 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1016 for displaying content. The device 110 may further include a camera 1018.

Via antenna(s) 1014, the input/output device interfaces 1002 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1002/1102) may also include communication components that allow data to be exchanged between devices such as different physical servers in a collection of servers or other components.

The components of the device(s) 110, the server(s) 120, or the skill server(s) 225 may include their own dedicated processors, memory, and/or storage. Alternatively, one or more of the components of the device(s) 110, the server(s) 120, or the skill server(s) 225 may utilize the I/O interfaces (1002/1102), processor(s) (1004/1104), memory (1006/1106), and/or storage (1008/1108) of the device(s) 110 server(s) 120, or the skill server(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the server(s) 120, and the skill server(s) 225, as described herein, are illustrative, and may be located as a stand-alone device or may be included, in whole or in part, as a component of a larger device or system.

Figure 12:
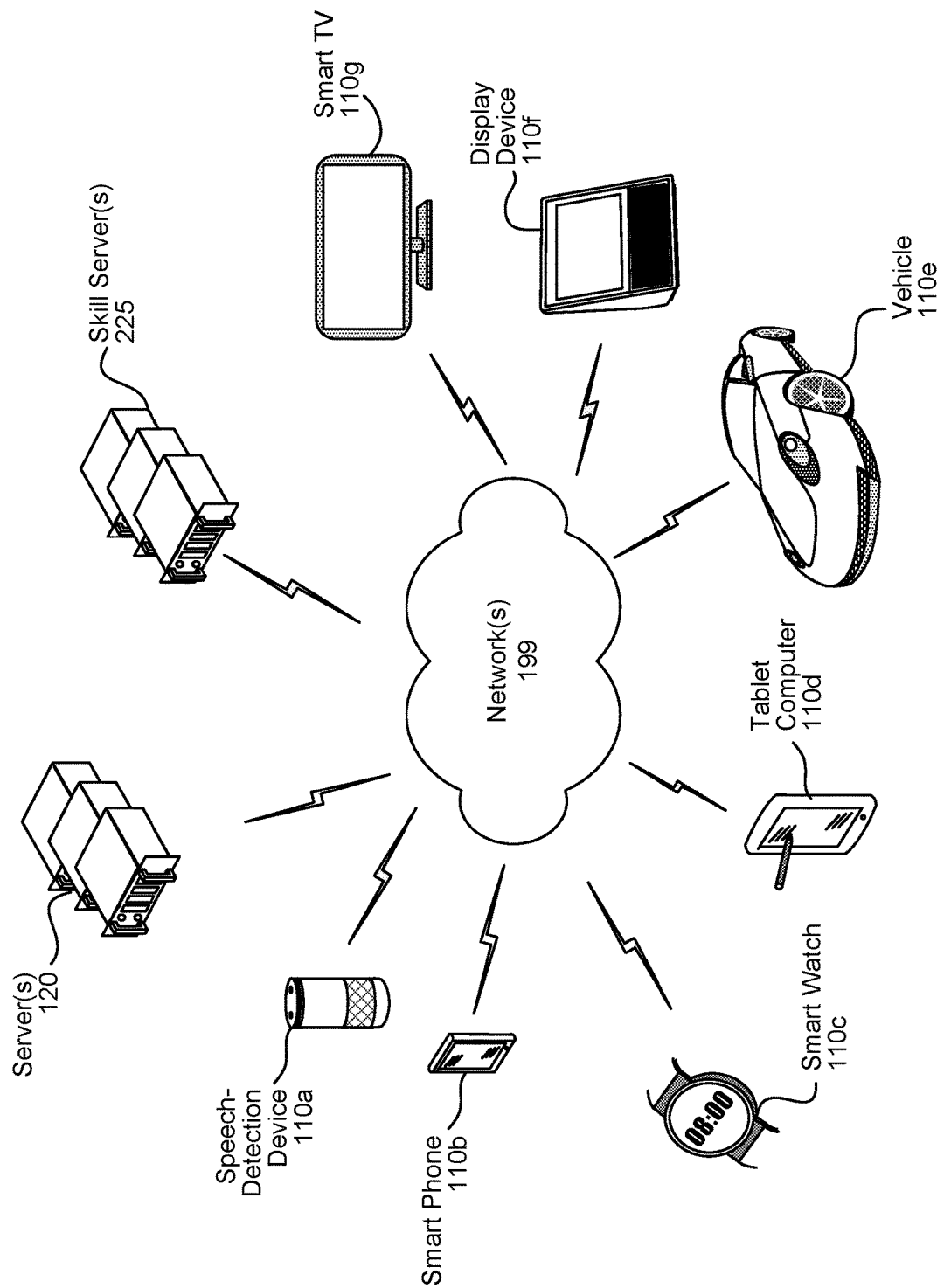
FIG. 12 illustrates an example of a computer network for use with the speech processing system.

As illustrated in FIG. 12, multiple devices (110a-110g, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, and/or a smart television 110g may be connected to the network(s) 199 through a wireless service provider, over a WiFi or cellular network connection, or the like. Other devices are included as network-connected support devices, such as the server(s) 120, the skill server(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
    during a first period of time:
        receiving, from a first device, metadata representing a user input is being received by the first device, the metadata including a user input identifier;
        based at least in part on receiving the metadata, determining first context information is to be used to perform automatic speech recognition (ASR) processing;
        querying, while the first device is receiving the user input, a first context source for the first context information; and
        storing a first association between the user input identifier and the first context information;
    during a second period of time after the first period of time:
        receiving, from an ASR component, a first request for context information associated with the user input identifier;
        sending, to the ASR component and based at least in part on the first association, the first context information;
        after sending the first context information to the ASR component, receiving ASR results data corresponding to the user input; and
        storing a second association between the user input identifier and the ASR results data.

2. The method of claim 1, further comprising:
    during a third period of time after the second period of time:
        determining second context information is to be used to perform natural language understanding (NLU) processing; and
        querying a second context source for the second context information;
    during a fourth period of time after the third period of time:
        receiving, from an NLU component, a second request for the second context information;
        sending, to the NLU component, the second context information; and
        after sending the second context information to the NLU component, receiving NLU results data.

3. The method of claim 2, further comprising:
during a fifth period of time after the fourth period of time:
determining third context information is to be used to select a skill to execute with respect to the NLU results data; and
querying a third context source for the third context information;
during a sixth period of time after the fifth period of time:
receiving a third request for the third context information;
based at least in part on receiving the third request, outputting the third context information; and
after outputting the third context information, receiving an indicator of a first skill configured to execute with respect to the NLU results data.

4. The method of claim 3, further comprising:
during a seventh period of time after the sixth period of time:
determining fourth context information is to be used by the first skill to execute with respect to the NLU results data; and
querying a fourth context source for the fourth context information;
during an eighth period of time after the seventh period of time:
receiving, from the first skill, a fourth request for the fourth context information; and
sending, to the first skill, the fourth context information.

5. A method, comprising:
receiving, from a first device, first data representing a user input is being received;
based at least in part on receiving the first data, determining first context information is to be used to perform processing with respect to the user input;
determining a user profile identifier associated with the first data;
querying a first context source for the first context information associated with the user profile identifier;
after querying the first context source, receiving a first request for the first context information; and
after receiving the first request, using the first context information to perform processing with respect to the user input.

6. The method of claim 5, further comprising:
receiving a second request for context information associated with a first entity identifier;
determining a second entity identifier associated with the first entity identifier;
querying a second context source for second context information associated with the first entity identifier; and
querying a third context source for third context information associated with the second entity identifier.

7. The method of claim 5, further comprising:
determining a second request for the first context information, associated with the user profile identifier, has been received;
based at least in part on the first request and the second request each being associated with the user profile identifier, determining at least one computing resource processing with respect to the second request; and
assigning processing of the first request to the at least one computing resource.

8. The method of claim 5, further comprising:
based at least in part on receiving the first data, querying a context information storage for the first context information, the context information storage including context information aggregated in response to at least one previous request for context information.

9. The method of claim 5, further comprising:
receiving a second request for second context information associated with an entity identifier;
identifying the second context information in a context information storage;
outputting the second context information;
after outputting the second context information, receiving an instruction to delete the second context information; and
based at least in part on receiving the instruction, deleting the second context information from the context information storage.

10. The method of claim 5, further comprising:
identifying second data representing a previously established parameter has changed;
based at least in part on identifying the second data, identifying, in a context information storage, second context information corresponding to the previously established parameter; and
deleting the second context information from the context information storage.

11. The method of claim 5, wherein:
the first data represents a spoken wakeword has been received; and
the first context information corresponds to information to be used to perform automatic speech recognition (ASR) processing.

12. The method of claim 5, wherein the first context information corresponds to a previous user input, the previous user input corresponding to a same user/system dialog as the user input.

13. A system, comprising:
at least one processor; and
at least one memory comprising instructions that, when executed by the at least one processor, cause the system to:
receive, from a first device, first data representing a user input is being received;
based at least in part on receiving the first data, determine first context information is to be used to perform processing with respect to the user input;
determine a user profile identifier associated with the first data;
query a first context source for the first context information associated with the user profile identifier;
after querying the first context source, receive a first request for the first context information; and
after receiving the first request, use the first context information to perform processing with respect to the user input.

14. The system of claim 13, wherein the at least one memory further comprises instructions that, when executed by the at least one processor, further cause the system to:
receive a second request for context information associated with a first entity identifier;
determine a second entity identifier associated with the first entity identifier;
query a second context source for second context information associated with the first entity identifier; and
query a third context source for third context information associated with the second entity identifier.

15. The system of claim 13, wherein the at least one memory further comprises instructions that, when executed by the at least one processor, further cause the system to:
- determine a second request for the first context information, associated with the user profile identifier, has been received;
- based at least in part on the first request and the second request each being associated with the user profile identifier, determine at least one computing resource processing with respect to the second request; and
- assign processing of the first request to the at least one computing resource.

16. The system of claim 13, wherein the at least one memory further comprises instructions that, when executed by the at least one processor, further cause the system to:
- based at least in part on receiving the first data, query a context information storage for the first context information, the context information storage including context information aggregated in response to at least one previous request for context information.

17. The system of claim 13, wherein the at least one memory further comprises instructions that, when executed by the at least one processor, further cause the system to:
- receive a second request for second context information associated with an entity identifier;
- identify the second context information in a context information storage;
- output the second context information;
- after outputting the second context information, receive an instruction to delete the second context information; and
- based at least in part on receiving the instruction, delete the second context information from the context information storage.

18. The system of claim 13, wherein the at least one memory further comprises instructions that, when executed by the at least one processor, further cause the system to:
- identify second data representing a previously established parameter has changed;
- based at least in part on identifying the second data, identify, in a context information storage, second context information corresponding to the previously established parameter; and
- delete the second context information from the context information storage.

19. The system of claim 13, wherein:
- the first data represents a spoken wakeword has been received; and
- the first context information corresponds to information to be used to perform automatic speech recognition (ASR) processing.

20. The system of claim 13, wherein the first context information corresponds to a previous user input, the previous user input corresponding to a same user/system dialog as the user input.

* * * * *